(12) United States Patent
Katoh et al.

(10) Patent No.: US 6,456,056 B1
(45) Date of Patent: Sep. 24, 2002

(54) INTERCONNECTION PROTECTIVE DEVICE FOR GENERATOR SET

(75) Inventors: Toyokuni Katoh, Tatsuno (JP); Shigeo Nomiya, Funabashi (JP)

(73) Assignees: Kabushiki Kaisha Toshiba, Kawasaki (JP); Nishishiba Electric Co., Ltd., Hyogo-ken (JP)

( * ) Notice: Subject to any disclaimer, the term of this patent is extended or adjusted under 35 U.S.C. 154(b) by 27 days.

(21) Appl. No.: 09/812,560

(22) Filed: Mar. 21, 2001

(30) Foreign Application Priority Data

Mar. 23, 2000 (JP) .......................................... 2000-082583

(51) Int. Cl.[7] .............................................. G01R 23/14
(52) U.S. Cl. ...................................... 324/76.41; 307/87
(58) Field of Search ...................... 307/82, 87; 324/520, 324/76.41, 76.52

(56) References Cited

U.S. PATENT DOCUMENTS 3,906,335 A * 9/1975 Watanabe ..................... 307/82
6,107,784 A 8/2000 Nomiya et al. ............... 307/87

FOREIGN PATENT DOCUMENTS

| JP | 9-135537 | 5/1997 |
| JP | 9-247863 | 9/1997 |
| JP | 10-215521 | 8/1998 |

* cited by examiner

Primary Examiner—Christine K. Oda
(74) Attorney, Agent, or Firm—Finnegan, Henderson, Farabow, Garrett & Dunner, L.L.P.

(57) ABSTRACT

The present invention provides a system interconnection protective device. A command for dropping a voltage is issued when the frequency change rate of a private generator set is positive, and a command for raising a voltage is issued when the frequency change rate is negative. The output voltage of the private generator set is varied by supplying an automatic voltage regulator with the voltage variation reference obtained by assisting the commands based on a rough tendency of frequency variations. Thus, a sole operation of the private generator set, which interconnects with a system, can reliably and easily be detected and protected on the side of the private generator set by enlarging the frequency variations without using any expensive transfer breaker.

8 Claims, 7 Drawing Sheets

INTERCONNECTION PROTECTIVE DEVICE FOR GENERATOR SET

CROSS-REFERENCE TO RELATED APPLICATIONS

This application is based upon and claims the benefit of priority from the prior Japanese Patent Application No. 2000-82583, filed Mar. 23, 2000, the entire contents of which are incorporated herein by reference.

BACKGROUND OF THE INVENTION

The present invention relates to a system interconnection protective device for a private generator set such as an urban-waste power generation system and a cogeneration system, which interconnects with a system power supply via a circuit breaker.

FIG. 1 shows a conventional system interconnection protective device that has been used in order that a customer can interconnect a system power supply with a private generator set such as an urban-waste power generation system and a cogeneration system.

As FIG. 1 illustrates, a host substation 4 drops a voltage of a system power supply 1 via a transformer 2 and supplies power to a customer 7 through a circuit breaker 3.

The customer 7 supplies the power to a load 6 through a circuit breaker 5.

The private generator set 10 supplies an output voltage of an alternating-current generator 12 to the system power supply 1 via a circuit breaker 11.

To control the output voltage of the alternating-current generator 12, an automatic voltage regulator (AVR) 13 controls a voltage of a field winding 14 of the generator 12.

To control the output frequency of the generator 12, a governor 15 of an engine 16 for driving the generator 12 controls power of the engine.

A generator fault detection circuit 22 is employed as a failure detection means. The circuit 22 detects an abnormal current based on a relationship between an output current of the generator 12 detected by a current transformer 21 and an output voltage of the generator 12. The circuit 22 then supplies a detection signal of the abnormal current to a trip circuit 23 to thereby open the circuit breaker 11.

A current transformer 24 is provided as a protecting means on the output side (the substation side) of the circuit breaker 11. An overcurrent relay (OC) 25 receives an output of the current transformer 24 to operate the trip circuit 23.

When the system power supply 1 malfunctions, especially when the power supply 1 is broken or the circuit breaker 3 is opened, various types of protective relays, such as an underfrequency relay (UF) 26, an overfrequency relay (OF) 27, an overvoltage relay (OV) 28, and an undervoltage relay (UV) 29, detect that an abnormal frequency or voltage is generated from an imbalance between an output power of the generator 12 and a load power of the load 6.

In response to a detection signal output from the protective relays, the trip circuit 23 gives a trip instruction to the circuit breaker 11 to open the circuit breaker 11 and allow the circuit breaker 3 to be reclosed.

The foregoing system interconnection protective device has the following problems:

If the active and reactive components of the output power of the alternating-current generator 12 and the required power of the load 6 are almost equal to each other when the system power supply 1 malfunctions to open the circuit breaker 3, the frequency and the voltage hardly vary. For this reason, none of the protective relays 25 to 29 operate, but the private generator set continues to operate. A so-called sole-operation (islanding) phenomenon occurs to prevent the circuit breaker 3 to be reclosed.

Some conventional devices adopt the following method in order to prevent the above islanding-operation phenomenon:

In this method, a transfer breaker 8 is connected to a private line extending from the substation 4. This device 8 causes the circuit breaker 11 to break the transfer of power.

In other words, the transfer breaker 8 detects a signal indicating that the circuit breaker 3 of the host substation 4 is opened and transmits a break signal to the circuit breaker 11 to open the breaker 11.

However, the cost of the transfer breaker 8 is very high for the private generator set 10 having a small-to-medium power of several hundreds of kilowatts. There is no practical merit in providing the transfer breaker in the system interconnection protective device.

BRIEF SUMMARY OF THE INVENTION

It is accordingly an object of the present invention to provide a system interconnection protective device for a private generator set, which is capable of reliably and easily detecting and protecting a sole operation of the private generator set, which interconnects with a system, without providing any expensive transfer breaker.

According to a first aspect of the present invention, there is provided a system interconnection protective device for a private generator set, which interconnects with a system power supply via a circuit breaker, the device comprising frequency detection means for detecting a frequency from an output of the private generator set, frequency change rate detection means for detecting a frequency change rate of the frequency detected by the frequency detection means, voltage variation reference determination means for defining a relationship between the frequency change rate and voltage variation reference by a function, the voltage variation reference increasing a leading reactive power of the private generator set when the frequency change rate detected by the frequency change rate detection means is positive increasing a lagging reactive power of the private generator set when the frequency change rate is negative, frequency change rate integration means for integrating the frequency change rate detected by the frequency change rate detection means, frequency variation tendency determination means for determining whether the frequency rises or lowers, based on a frequency change rate integration amount integrated by the frequency change rate integration means, bias means for applying a bias to the voltage variation reference output from the voltage variation reference determination means to decrease the voltage variation reference when the frequency variation tendency determination means determines that the frequency rises and applying a bias to the voltage variation reference output therefrom to increase the voltage variation reference when the frequency variation tendency determination means determines that the frequency lowers, and protection means for detecting a frequency variation promoted due to a voltage variation of the private generator set caused by adding the voltage variation reference to which the bias is applied by the bias means, to voltage reference of an automatic voltage regulator of the private generator set, thereby opening the circuit breaker and disconnecting the private generator set from a system bus.

In addition to the above means, the system interconnection protective device may further comprise reset means for determining whether the frequency change rate detected by the frequency change rate detection means falls within a narrow range close to zero and resetting the frequency change rate integration amount integrated by the frequency change rate integration means to zero when the frequency change rate falls within the small range. The protection means can determine whether the private generator set is to be disconnected from the system line on a first condition that the frequency change rate detected by the frequency change rate detection means exceeds a value, on a second condition that the frequency change rate integration amount integrated by the frequency change rate integration means exceeds a value, or by AND of the first and second conditions. The same is true of the reset means and the protection means of the second aspect described below.

According to the second aspect of the present invention, there is provided a system interconnection protective device for a private generator set, which interconnects with a system power supply via a circuit breaker, the device comprising frequency detection means for detecting a frequency from an output of the private generator set, frequency change rate detection means for detecting a frequency change rate of the frequency detected by the frequency detection means, voltage variation reference determination means for defining a relationship between the frequency change rate and voltage variation reference by a function, the voltage variation reference increasing a leading reactive power of the private generator set when the frequency change rate detected by the frequency change rate detection means is positive increasing a lagging reactive power of the private generator set when the frequency change rate is negative, and for allowing a gain or a shape of the function to be switched to a plurality of stages, voltage variation reference selection means for setting a plurality of threshold values to the frequency change rate detected by the frequency change rate detection means and issuing a select command for selecting the gain of the function or the shape thereof to the voltage variation reference determination means whenever the frequency change rate exceeds each of the threshold values, frequency change rate integration means for integrating the frequency change rate detected by the frequency change rate detection means, frequency variation tendency determination means for determining whether the frequency rises or lowers, based on a frequency change rate integration amount integrated by the frequency change rate integration means, bias means for applying a bias to the voltage variation reference output from the voltage variation reference determination means to decrease the voltage variation reference when the frequency variation tendency determination means determines that the frequency rises and applying a bias to the voltage variation reference output therefrom to increase the voltage variation reference when the frequency variation tendency determination means determines that the frequency lowers, switch means for determining whether the bias means applies the bias to the voltage variation reference in response to the select command output from the voltage variation reference selection means, and protection means for detecting a frequency variation promoted due to a voltage variation of the private generator set caused by adding the voltage variation reference to which the bias is applied by the bias means, to voltage reference of an automatic voltage regulator of the private generator set, thereby opening the circuit breaker and disconnecting the private generator set from a system bus.

According to the first aspect described above, a frequency change rate of a private generator set is detected. A command for dropping a voltage is issued when the detected frequency change rate is positive, and a command for raising a voltage is issued when the frequency change rate is negative. The output voltage of the private generator set is varied by supplying an automatic voltage regulator with the voltage variation reference obtained by assisting the commands based on a rough tendency of frequency variations.

Thus, a sole operation of the private generator set, which interconnects with a system, can reliably and easily be detected and protected on the side of the private generator set by enlarging the frequency variations and without using any expensive transfer breaker.

According to the second aspect described above, the multi-step detection method reduces an influence upon a system with which the private generator set is interconnecting and enlarges a frequency variation in a sole operation of the private generator set by assisting voltage variation reference, thus detecting a frequency and an abnormal frequency change rate.

The sole operation of the private generator set that interconnects with a system can be detected and protected more reliably and easily on the side of the private generator set by enlarging the frequency variation and without providing any expensive transfer breaker.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

Figure 4:
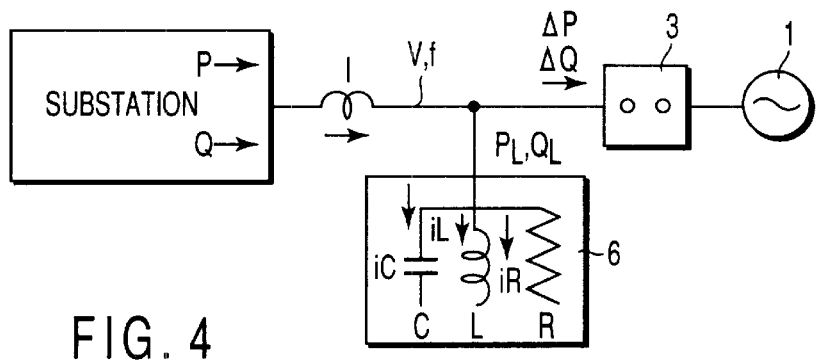
Figure 5:
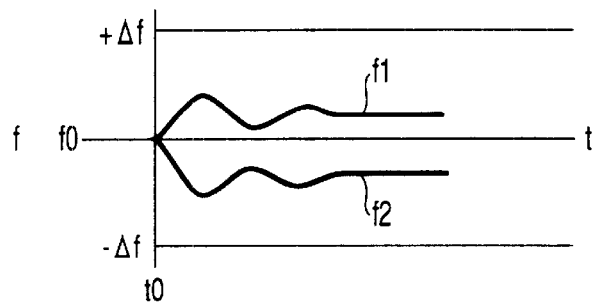
Figure 6:
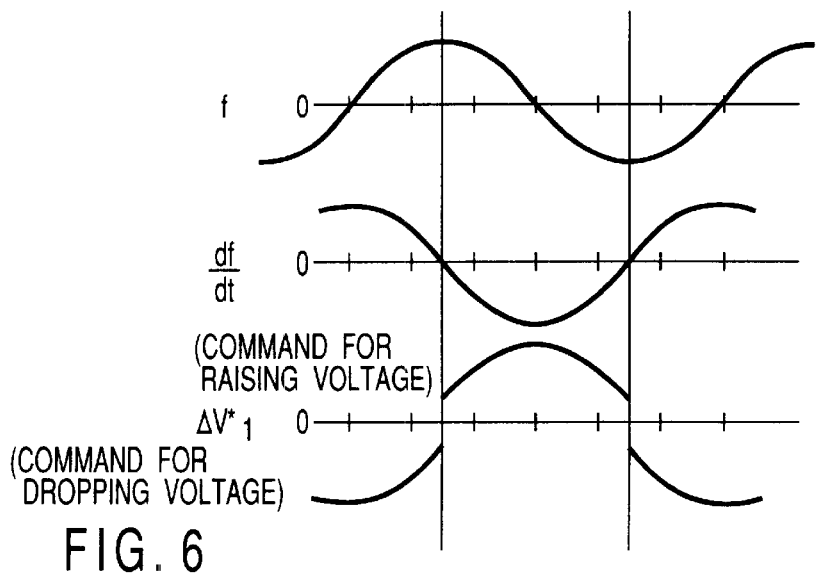
Figure 7:
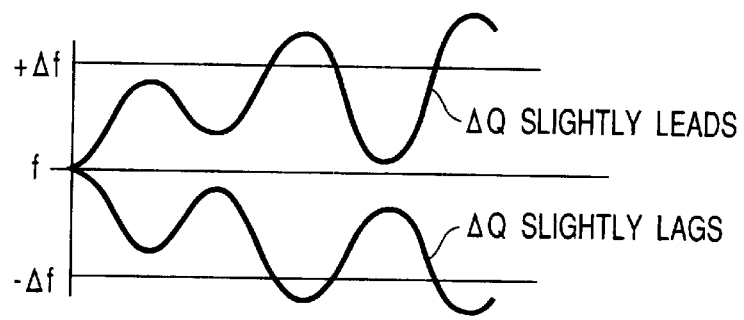
Figure 9:
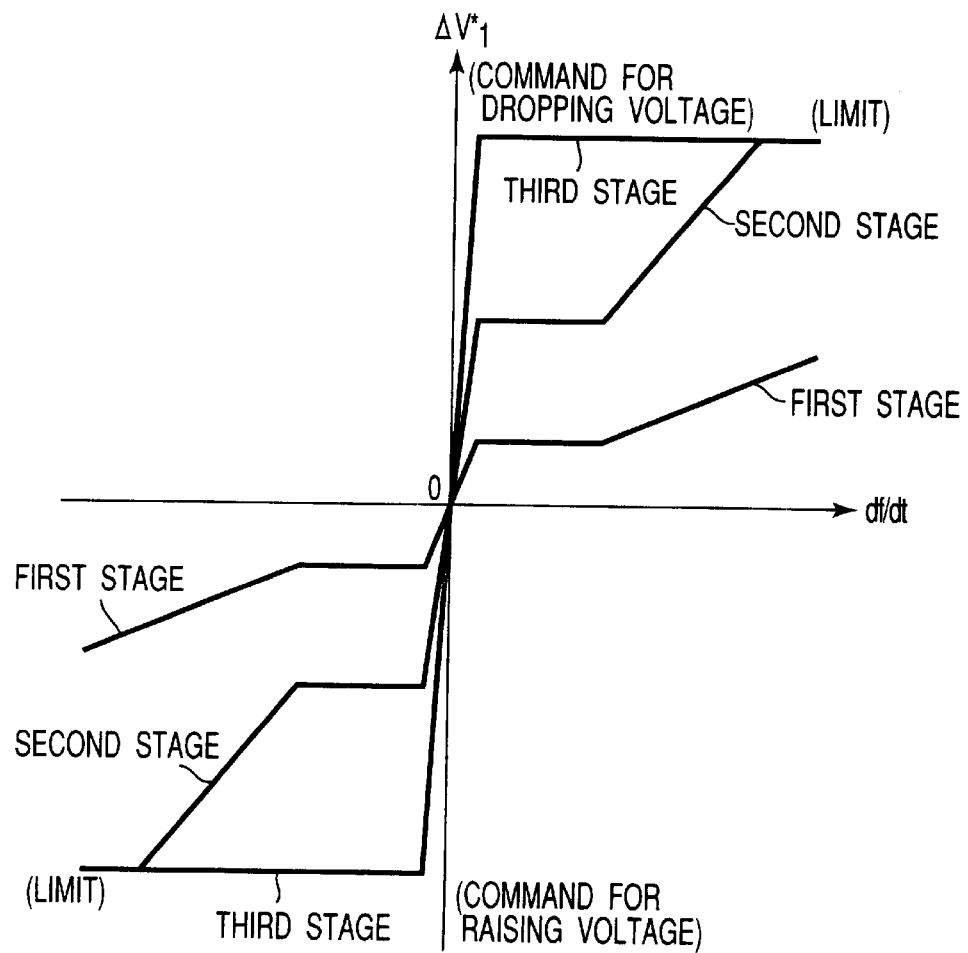
Figure 8:
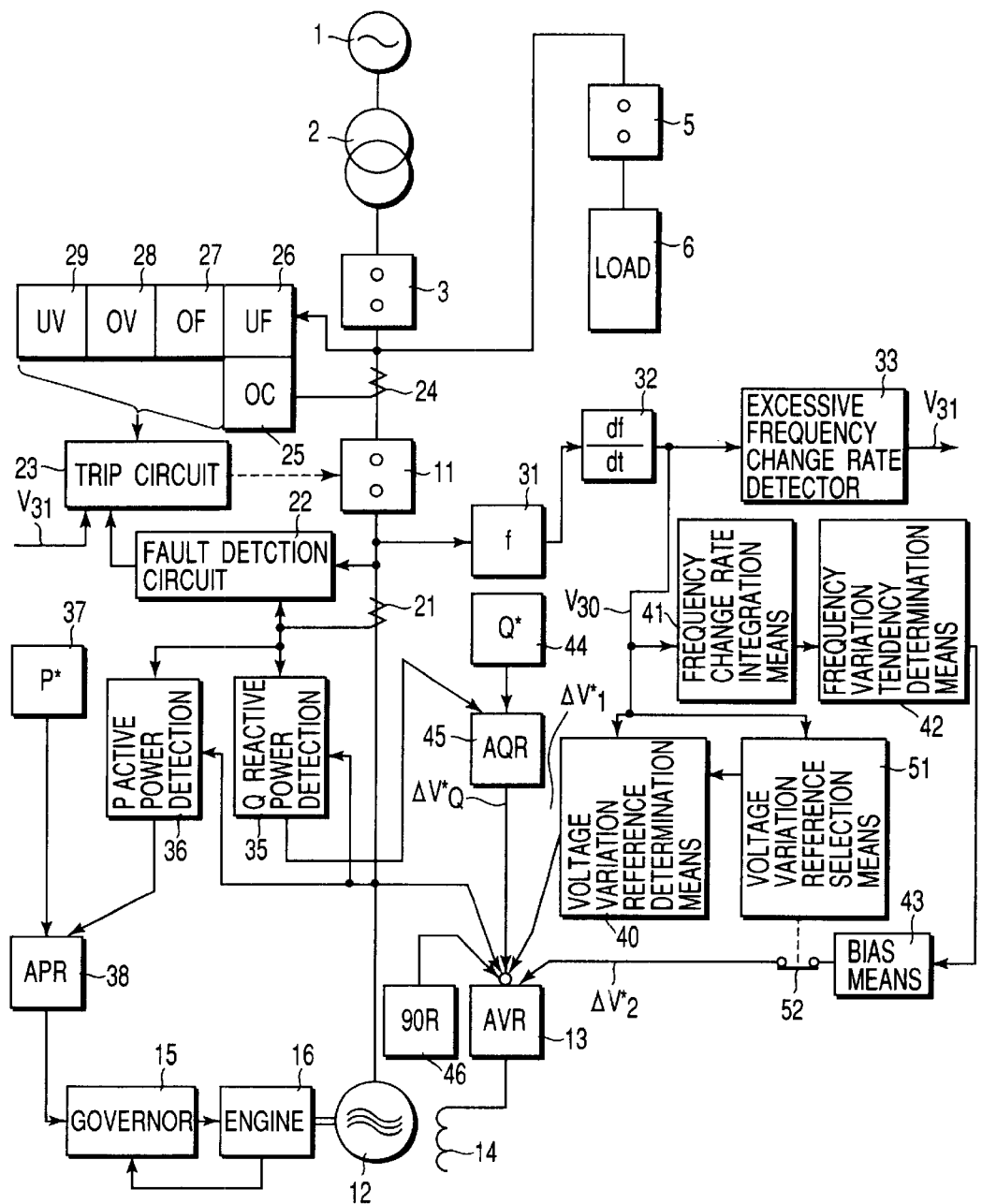
Figure 10:
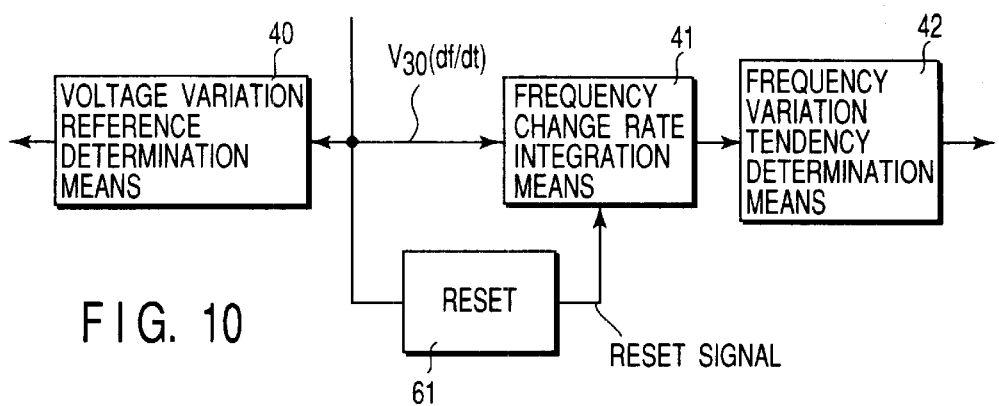
Figure 11A:
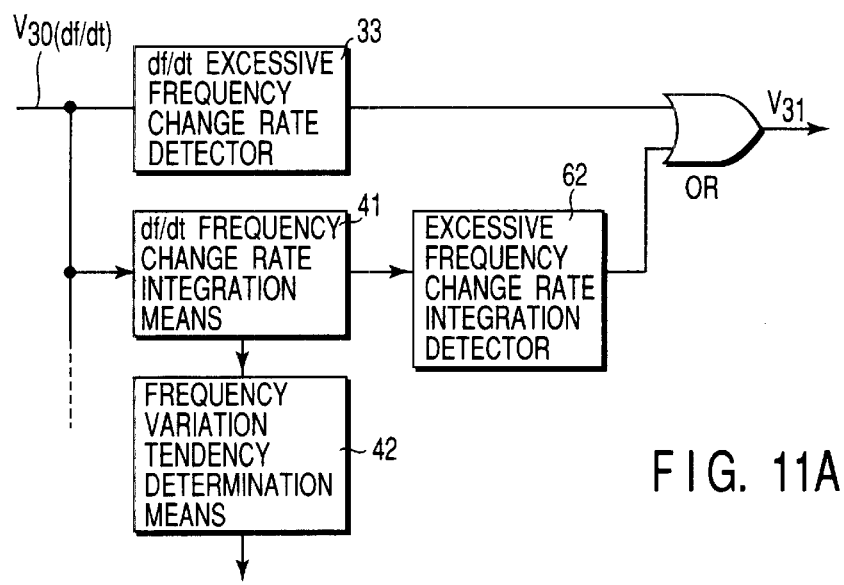
Figure 11B:
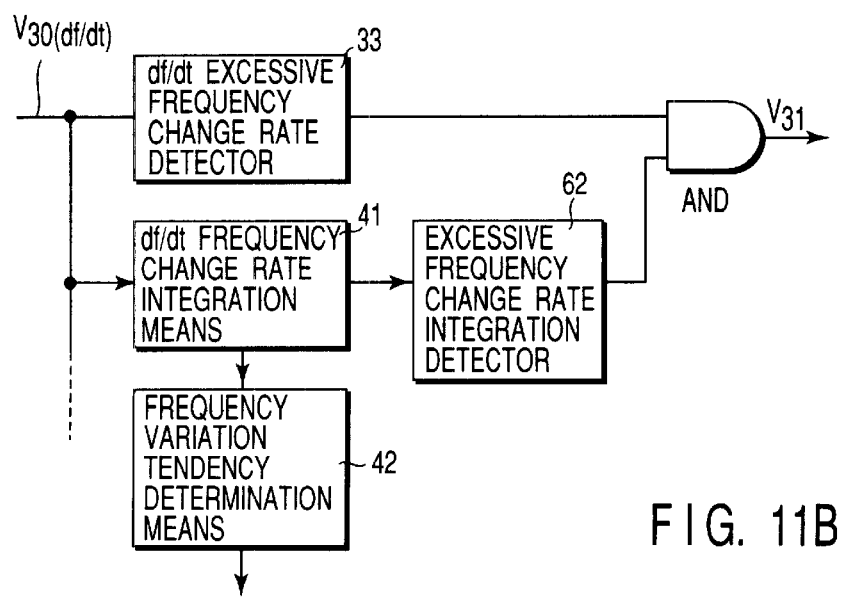

FIGS. A and 3B are graphs each showing an example of the shape of a function for determining voltage variation reference in the system interconnection protective device according to the first embodiment of the present invention;

FIG. 4 is a block diagram explaining an operation of the system interconnection protective device according to the first embodiment of the present invention;

FIG. 5 is a chart explaining an operation of the system interconnection protective device according to the first embodiment of the present invention;

FIG. 6 is another chart explaining an operation of the system interconnection protective device according to the first embodiment of the present invention;

FIG. 7 is a still another chart explaining an operation of the system interconnection protective device according to the first embodiment of the present invention;

FIG. 8 is a block diagram of a system interconnection protective device for a generator set according to a second embodiment of the present invention;

FIG. 9 is a graph showing an example of the shape of a function for determining voltage variation reference by a multi-step detection method in the system interconnection protective device according to the second embodiment of the present invention;

FIG. 10 is a block diagram illustrating a main part of a system interconnection protective device for a generator set according to a third embodiment of the present invention; and FIGS. 11A and 11B are block diagrams each showing a main part of a system interconnection protective device for a generator set according to a fourth embodiment of the present invention.

DETAILED DESCRIPTION OF THE INVENTION

Embodiments of the present invention will now be described in detail with reference to the accompanying drawings.

Figure 2:
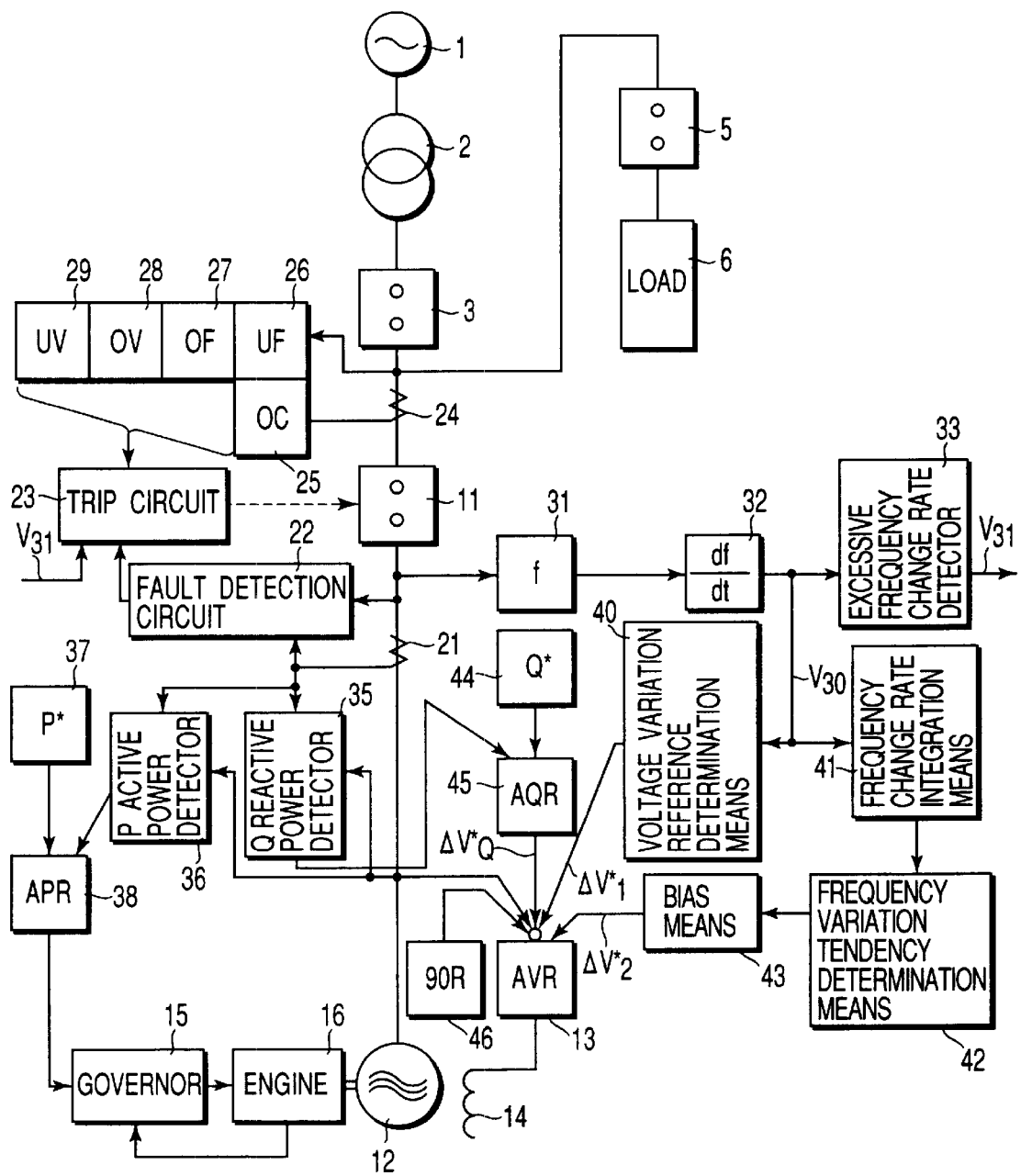
FIG. 2 is a block diagram of a system interconnection protective device for a generator set according to a first embodiment of the present invention.

FIG. 2 is a block diagram illustrating a system interconnection protective device for a generator set according to a first embodiment of the present invention.

Figure 1:
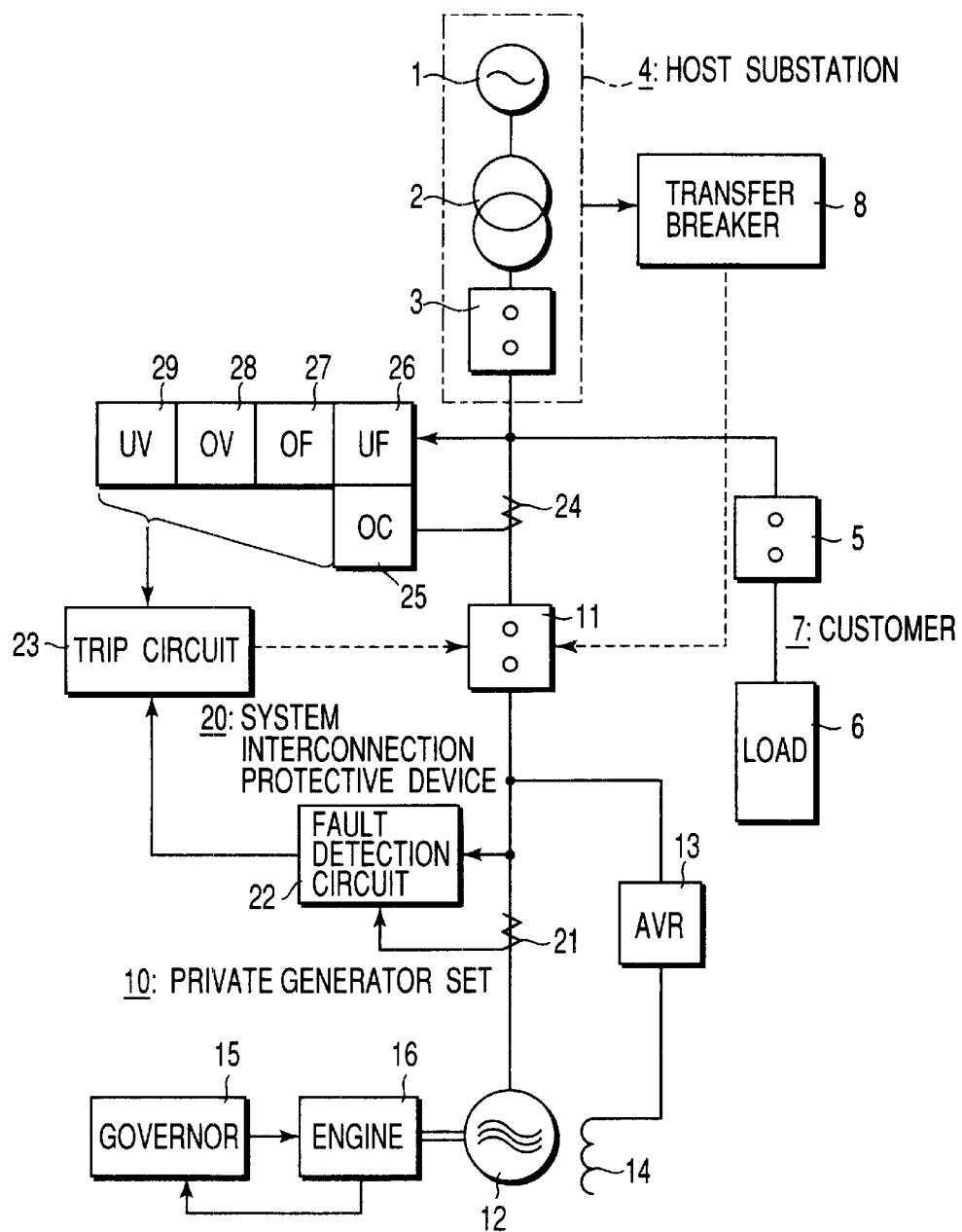
FIG. 1 is a block diagram showing an example of a prior art system interconnection protective device for a generator set.

In FIG. 2, the same constituting elements as those in FIG. 1 are indicated by the same reference numerals and their descriptions are omitted. In other words, only different constituting elements will be described hereinafter.

The system interconnection protective device of FIG. 2 differs from the prior art one of FIG. 1 in that it excludes the above-described expensive transfer breaker 8 and substitutes the following constitution therefor.

As FIG. 2 shows, a frequency (f) detector 31 detects a frequency from an output voltage of an alternating-current generator 12. A frequency change rate (df/dt) detector 32 detects a frequency change rate V30 from the detected frequency.

An excessive frequency change rate (df/dt) detector 33 detects whether the frequency change rate V30 exceeds a set value. If the rate V30 is not lower than the set value, the detector 33 outputs an abnormal output signal V31 and supplies it to a trip circuit 23.

Upon receiving the abnormal output signal V31, the trip circuit 23 supplies a trip signal to a circuit breaker 11 to open an electric circuit.

A reactive power (Q) detector 35 receives an output current of the alternating-current generator 12 detected by a current transformer 21 and an output voltage of the generator 12 and detects reactive power Q based on the output current and output voltage.

An active power (P) detector 36 receives an output current of the alternating-current generator 12 detected by the current transformer 21 and an output voltage of the generator 12 and detects active power P based on the output current and output voltage.

An active power control circuit (APR) 38 compares active power reference P from an active power reference (P*) setting device 37 with the active power P from the active power detector 36. The circuit 38 supplies a difference between them to a governor 15 to control a motor of an engine 16.

A voltage variation reference determination means 40 receives a frequency change rate V30 from the frequency change rate detector 32 and outputs voltage variation reference ΔV*1.

The relationship between the frequency change rate V30 and the voltage variation reference ΔV*1 is defined as a function as shown in FIG. 2 so as to In order to output voltage variation reference ΔV*1 that lowers an output voltage of the alternating-current generator 12 and raises the frequency when the frequency change rate V30 is positive (while the frequency is increasing) and that raises an output voltage of the generator 12 and lowers the frequency when the frequency change rate V30 is negative (while the frequency is decreasing), a relationship between the frequency change rate V30 and the voltage variation reference ΔV*1 is defined by the function as shown in FIG. 2.

Figure 3A:
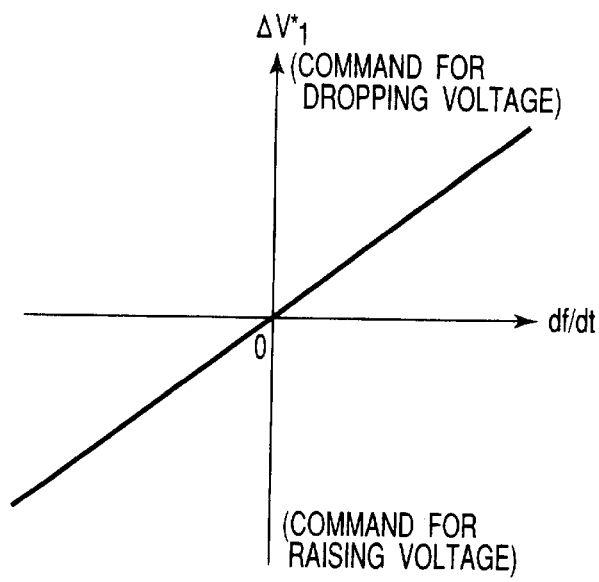
Figure 3B:
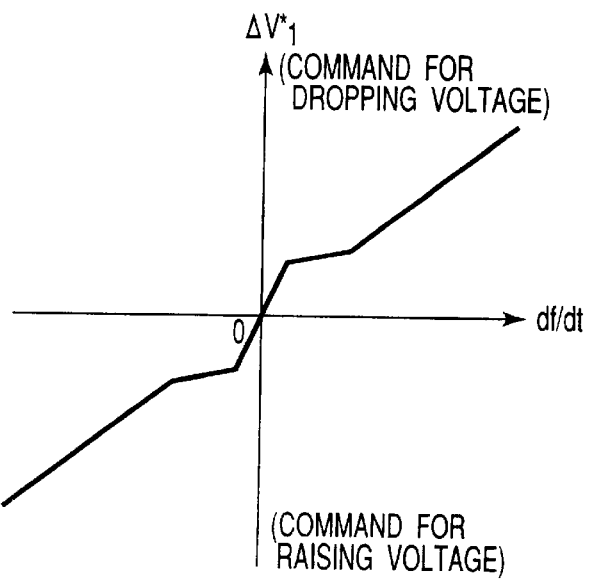

FIGS. 3A and 3B each show an example of the above function.

A frequency change rate integration means 41 integrates a positive signal (indicating an increasing frequency) of the frequency change rate V30 and a negative signal (indicating a decreasing frequency) thereof.

A frequency variation tendency determination means 42 roughly determines a variation direction of the frequency based on the amount of integration of frequency change rates obtained by the frequency change rate integration means 41.

A bias means 43 outputs a bias signal ΔV*2 in accordance with the frequency variation direction determined by the frequency variation tendency determination means 42.

If the frequency variation direction corresponds to a direction in which the frequency increases, the bias means 43 outputs a bias signal ΔV*2 that lowers the voltage variation reference ΔV*1. If the frequency variation direction corresponds to a direction in which the frequency decreases, the bias means 43 outputs a bias signal ΔV*2 that raises the voltage variation reference ΔV*1.

A reactive power control circuit (AQR) 45 outputs voltage reference ΔVQ* such that reactive power reference Q* set by a reactive power reference (Q*) setting device 44 and active power Q detected by the reactive power detector 35 coincide with each other.

An automatic voltage regulator (AVR) 13 regulates a field of a field winding 14 so as to control an output voltage of the alternating-current generator 12 on the basis of voltage reference V* set by a voltage reference (V*) setting device (90R) 46, voltage reference ΔVQ* output from the reactive power control circuit 45, voltage variation reference ΔV*1 output from the voltage variation reference determination means 40, and bias signal ΔV*2 output from the bias means 43.

In the foregoing system interconnection protective device, the active power reference (P*) setting device 37, the active power control circuit 38, the governor 15, and the engine 16 constitute an active power control loop.

The reactive power reference setting device 44, the reactive power detector 35, and the reactive power control circuit 45 constitute a reactive power control loop.

The voltage reference (V*) setting device (90R) 46, the voltage reference ΔVQ* that is an output of the reactive power control circuit 45, the voltage variation reference ΔV*1 determined by the voltage variation reference determination means 40, the bias signal ΔV*2 from the bias means 43, and the automatic voltage regulator 13 constitute a voltage control loop.

An operation of the system interconnection protective device for a generator set according to the first embodiment described above will now be described with reference to FIGS. 4 to 7.

Assuming in FIG. 4 that the active power of the alternating-current generator 12 is P, the reactive power thereof is Q, the active power of a load 6 is PL, and the reactive power thereof is QL, the active power AP and reactive power AQ flowing into a system power supply 1 are represented as follows:

$$\Delta P = P - PL$$

$$\Delta Q = Q - QL$$

Assume that an inductance between the alternating-current generator 12 and the system is 1, the voltage of the load 6 is V, and the frequency thereof is f.

In the normal operation, the voltage V and frequency f of the load 6 hardly vary even though a circuit breaker 3 opens when $\Delta P \approx 0$ and $\Delta Q \approx 0$.

None of protective relays 25 to 29 can detect the voltage V or frequency f of the load 6. The private generator set therefore continues to perform its sole operation.

The phases of the system power supply 1 and the load 6 are shifted slowly. The reclosing of the circuit breaker 3 will cause an accident. Thus, the circuit breaker 3 cannot be reclosed to prevent an accident, which decreases the stability of a distribution system.

The voltage in the sole operation depends upon the following equation: $P = V^2/R$. On the other hand, the frequency f depends upon the following equation: $Q = (V^2 \omega C) - (V^2/\omega L)$.

When the reactive power supplied from the alternating-current generator 12 is shifted in the leading direction from the reactive power QL required by the load 6, the frequency f rises, the current iC of a capacitor C increases, the inductance current iL decreases, and the reactive power changes in its balanced direction.

When the reactive power supplied from the alternating-current generator 12 is shifted in the lagging direction from the reactive power QL required by the load 6, the frequency f lowers, the inductance current iL increases, the capacitor current iC decreases, and the reactive power changes in its balanced direction.

If the sole operation is performed when $\Delta P \approx 0$ and $\Delta Q \neq 0$, the frequency f varies and comes close to stable points f1 and f2 after the system is broken (t0), as illustrated in FIG. 5.

In FIG. 5, f1 indicates that $\Delta Q$ slightly leads, and f2 represents that $\Delta Q$ slightly lags.

In FIG. 5, $+\Delta f$ and $-\Delta f$ are levels at which a sole operation can be detected by the protective relays 25 to 29.

FIG. 6 is a chart explaining an advantage of the second embodiment shown in FIG. 2.

In FIG. 6, f represents a frequency detected by the frequency detector 31, df/dt shows a frequency change rate of the frequency detected by the frequency change rate detector 32, and $\Delta V^*1$ indicates an output of the voltage variation reference determination means 40.

If the frequency f changes as shown in FIG. 6, the frequency change rate df/dt exhibits a waveform the phase of which advances 90°.

When the frequency change rate df/dt is larger than 0, the frequency f is increasing. During this period, the voltage variation reference determination means 40 issues a voltage drop command (leading reactive power command), and the frequency f increases further.

When the rate df/dt is smaller than 0, the frequency f is decreasing. During this period, the voltage variation reference determination means 40 issues a voltage rise command (lagging reactive power command), and the frequency f decreases further.

If, then, the polarity of df/dt varies to positive and negative values at very small regular intervals after the system is disconnected, a delay of an exciting system prevents the voltage from being changed sufficiently based on the voltage variation reference. It is thus thought that the frequency is difficult to vary smoothly.

By integrating frequency change rates using the frequency change rate integration means 41 and frequency variation tendency determination means 42, a rough variation of the frequency f is detected, and a bias signal $\Delta V^*2$ is supplied to the voltage variation reference $\Delta V^*1$ in accordance with the frequency variation direction. Thus, the voltage variation direction is held on one of the rising and lowering directions to facilitate the voltage variation.

The variation in frequency is increased by the positive feedback due to the voltage variation, and the abnormal frequency and the excessive frequency change rate are detected by the excessive frequency change rate detector 33.

Consequently, the sole operation of the private generator set 10 can reliably be detected without using any expensive transfer breaker 8 that has been used conventionally.

The frequency variation in the islanding operation of the private generator set 10, as shown in FIG. 5, is increased to that as shown in FIG. 7, thereby detecting a frequency and an abnormal rate of the frequency variation.

Consequently, the sole operation of the private generator set 10 can be detected easily and reliably on the side of the private generator set 10.

In the foregoing system interconnection protective device according to the first embodiment, a voltage drop command is issued when the frequency change rate df/dt of the alternating-current generator 12 is larger than 0 and a voltage rise command is issued when the frequency change rate df/dt is smaller than 0. Furthermore, the output voltage of the alternating-current generator 12 is varied by supplying the automatic voltage regulator 13 with voltage variation reference that is obtained by assisting the voltage drop command or voltage rise command based on a rough tendency of the frequency variation.

Consequently, the sole operation of the interconnected private generator set 10 can reliably and easily be detected and protected on the side of the private generator set by enlarging a variation in frequency, without providing any expensive transfer breaker 8 as described above.

FIG. 8 is a block diagram showing a system interconnection protective device for a generator set according to a second embodiment of the present invention.

In FIG. 8, the same constituting elements as those in FIG. 2 are indicated by the same reference numerals and their descriptions are omitted. In other words, only different constituting elements will be described hereinafter.

The interconnection protective device shown in FIG. 8 differs from the device shown in FIG. 2 in the following points.

In the device illustrated in FIG. 8, the following functions are added to the voltage variation reference determination means 40 shown in FIG. 2, and a voltage variation reference selection means 51 and a switch means 52 are newly added.

As described above, th voltage variation reference determination means 40 defines a relationship between frequency change rate V30 and voltage variation reference $\Delta V^*1$ by a function. The gain of the function or the shape of the function can be switched to a plurality of stages.

The voltage variation reference selection means 51 sets a plurality of threshold values to the frequency change rate detected by the frequency change rate detector 32. The means 51 issues a command for switching the gain or shape of the function to the voltage variation reference determination means 40 whenever the frequency change rate exceeds each of the threshold values.

The switch means 52 controls the bias means 43 to determine whether the bias means 43 biases the voltage variation reference in response to a selection command output from the voltage variation reference selection means 51.

An operation of the above-described system interconnection protective device according to the second embodiment of the present invention will now be described with reference to FIG. 9.

In FIG. 8, the voltage variation reference determination means 40 receives a frequency change rate V30 from the frequency change rate detector 32 and outputs voltage variation reference ΔV*1.

As in the first embodiment described above, when the frequency change rate is positive (while the frequency is increasing), the output voltage of the alternating-current generator 12 lowers to promote the increase of the frequency.

When the frequency change rate is negative (while the frequency is decreasing), the voltage variation reference ΔV*1 is output so as to increase the output voltage of the alternating-current generator 12 and thus promote the decrease of the frequency.

The greater the voltage variation, the greater the frequency variation. In order to determine whether the private generator set 10 is operating solely or interconnecting with a system, it is favorable to vary a voltage that causes a frequency to vary sufficiently when the private generator set operates solely. If, however, a command for greatly varying a voltage is issued during the interconnection with the system, it is likely that a disturbance will be caused in the system.

At first, the voltage variation reference ΔV*1 is set at a small level that has no adverse influence on the system. When the frequency change rate exceeds the first-set threshold value, the voltage variation reference ΔV*1 is set at a larger level.

If the frequency change rate exceeds the next threshold value, the voltage variation reference ΔV*1 is set at a still larger level.

The multi-step detection method is therefore achieved in which the above operations are repeated some times to gradually enlarge the action due to the voltage variation reference ΔV*1 while confirming that the private generator set seems to operate solely.

The multi-step detection method is achieved by the voltage variation reference selection means 51 having a plurality of frequency change rate threshold values and issuing a voltage variation reference selection command to the voltage variation reference determination means 40.

The voltage variation reference determination means 40 allows the gain or the shape of a function for determining voltage variation reference from the frequency change rate to be switched. This switching is performed in response to a command from the voltage variation reference selection means 51.

FIG. 9 is a graph showing an example of a function for determining voltage variation reference. In this example, a plurality of stages of functions are prepared, and a limit level can be set.

The frequency change rate integration means 41, frequency variation tendency determination means 42, and bias means 43 perform the same operations as those of the means of the first embodiment.

If the frequency change rate enlarges to some extent, the multi-step detection method produces a sufficient voltage variation reference ΔV*1 without a bias signal ΔV*2.

The switch means 52 stops an assist of the bias signal ΔV*2 in accordance with the progress of the multi-step detection.

The multi-step detection method reduces an influence upon a system with which the private generator set is interconnecting.

In other words, when the private generator set 10 operates solely, the voltage variation reference ΔV*1 is assisted in addition to the operation of enlarging a variation in frequency, and the frequency variation in the sole operation of the private generator set 10, as shown in FIG. 5, is increased to that as shown in FIG. 7, thereby detecting a frequency and an abnormal frequency change rate.

Thus, the sole operation of the private generator set 10 can reliably and easily be detected on the automatic private set side.

In the system interconnection protective device described above, the multi-step detection method reduces an influence upon a system with which the private generator set is interconnecting and, when the private generator set operates solely, the voltage variation reference is assisted in addition to the operation of enlarging a variation in frequency, and the frequency variation in the sole operation of the private generator set is increased, thereby detecting a frequency and an abnormal rate of change of the frequency.

Consequently, the frequency variation is enlarged, and a sole operation of the private generator set 10, which interconnects with a system, can reliably and easily detected and protected on the private generator set 10 without providing any expensive transfer breaker 8.

FIG. 10 is a block diagram showing a main part of a system interconnection protective device for a generator set according to a third embodiment of the present invention.

In FIG. 10, the same constituting elements as those in FIGS. 2 and 8 are indicated by the same reference numerals and their descriptions are omitted. In other words, only different constituting elements will be described hereinafter.

The system interconnection protective device shown in FIG. 10 differs from the devices shown in FIGS. 2 and 8 in the following points.

The device illustrated in FIG. 10 is achieved by newly adding a reset means 61 to the devices of the first and second embodiments shown in FIGS. 2 and 8.

The reset means 61 determines whether the frequency change rate detected by the frequency change rate detector 32 falls within a narrow range close to zero. When it falls within the range, the frequency change rate integration amount obtained by the frequency change rate integration means 41 is reset to zero.

An operation of the above-described system interconnection protective device according to the third embodiment will now be described.

In FIG. 10, the reset means 61 determines whether the frequency change rate falls within a small range close to zero. If it falls within the narrow range, the reset means 61 issues a command for resetting a frequency change rate integration amount to the frequency change rate integration means 41.

It is thus possible to prevent the amount of integration of frequency change rates from continuing to increase in accordance with a slow change of the frequency of the private generator set that is interconnecting with the system. It is also possible to prevent a bias signal ΔV*2 from issuing from the bias means 43 to the polarity other than the direction of frequency variation when the private generator set shifts to its sole operation.

Moreover, the issuance of the bias signal ΔV*2 from the bias means 43 can suppress an increase in cross current of reactive power and a change in voltage.

In the above-described system interconnection protective device according to the third embodiment, the amount of integration of frequency change rates is reset to zero when the frequency change rate of the private generator set 10 falls within a narrow range close to zero.

The amount of integration of frequency change rates can thus be prevented from continuing to increase in accordance with a slow change of the frequency of the private generator set that is interconnecting with the system. Furthermore, the bias means 43 can be prevented from applying a bias to the polarity other than the direction of frequency variation when the private generator set shifts to its sole operation.

Moreover, the application of the bias from the bias means 43 during the interconnection of the private generator set can suppress an increase in cross current of reactive power and a change in voltage.

FIG. 11A is a block diagram showing a main part of a system interconnection protective device for a generator set according to a fourth embodiment of the present invention.

In FIG. 11A, the same constituting elements as those in FIGS. 2 and 8 are indicated by the same reference numerals and their descriptions are omitted. In other words, only different constituting elements will be described hereinafter.

The system interconnection protective device shown in FIG. 11A differs from the devices shown in FIGS. 2 and 8 in the following points.

The device illustrated in FIG. 11A is achieved by newly adding an excessive frequency change rate integration detector 62 and an OR circuit OR to the devices shown in FIGS. 2 and 8.

The detector 62 detects whether the frequency change rate integration amount supplied from the frequency change rate integration means 41 exceeds a set value. If the amount exceeds the set value, the detector 62 outputs a signal indicative of the excessive amount.

The OR circuit OR receives a detection signal from the excessive frequency change rate detector 33 and a detection signal from the excessive frequency change rate integration detector 62, and supplies the trip circuit 23 with an OR signal of both the detection signals as an abnormal output signal V31.

An operation of the above-described system interconnection protective device according to the fourth embodiment of the present invention will now be described.

In FIG. 11A, the excessive frequency change rate integration detector 62 detects whether the frequency change rate or the frequency change rate integration amount becomes excessive on the basis of both the detection signals from the detectors 33 and 62. When the detector 62 detects that the rate or amount becomes excessive, it supplies an abnormal output signal V31 to the trip circuit 23.

In the above-described system interconnection protective device according to the fourth embodiment, the private generator set 10 is disconnected from a system bus when the frequency change rate or frequency change rate integration amount of the private generator set 10 exceeds a certain value.

Consequently, the sole operation of the private generator set 10 that is interconnecting with the system can be detected and protected more reliably and easily on the side of the private generator set 10.

(Modification)

FIG. 11B is a block diagram showing a main part of a system interconnection protective device for a generator set according to a modification to the present invention.

In FIG. 11B, the same constituting elements as those in FIGS. 2 and 8 are indicated by the same reference numerals and their descriptions are omitted. In other words, only different constituting elements will be described hereinafter.

The system interconnection protective device shown in FIG. 11B differs from the devices shown in FIGS. 2 and 8 in the following points.

The device illustrated in FIG. 11B is achieved by newly adding an excessive frequency change rate integration detector 62 and an AND circuit to the devices shown in FIGS. 1 and 7.

The detector 62 detects whether the frequency change rate integration amount supplied from the frequency change rate integration means 41 exceeds a set value. If the amount exceeds the set value, the detector 62 outputs a signal indicative of the excessive amount.

The AND circuit AND receives a detection signal from the excessive frequency change rate detector 33 and a detection signal from the excessive frequency change rate integration detector 62, and supplies the trip circuit 23 with an AND signal of both the detection signals as an abnormal output signal V31.

An operation of the above-described system interconnection protective device according to the modification to the present invention will now be described.

In FIG. 11B, when the excessive frequency change rate integration detector 62 detects that the frequency change rate and the frequency change rate integration amount becomes excessive on the basis of both the detection signals from the detectors 33 and 62, it supplies an abnormal output signal V31 to the trip circuit 23.

In the above-described system interconnection protective device according to the modification, the private generator set 10 is disconnected from a system bus when the condition of AND that the frequency change rate of the private generator set 10 and the frequency change rate integration amount thereof exceeds a certain value is satisfied.

Consequently, the sole operation of the private generator set 10 that is interconnecting with the system can be detected and protected more reliably and easily on the side of the private generator set 10.

According to the system interconnection protective device described above, the sole operation of a private generator set that is interconnecting with a system can be detected and protected more reliably and easily on the side of the private generator set without providing any expensive transfer breaker.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system interconnection protective device for a private generator set, which interconnects with a system power supply via a circuit breaker, the device comprising:

frequency detection means for detecting a frequency from an output of the private generator set;

frequency change rate detection means for detecting a frequency change rate of the frequency detected by the frequency detection means;

voltage variation reference determination means for defining a relationship between the frequency change rate and voltage variation reference by a function, the voltage variation reference increasing a leading reactive power of the private generator set when the frequency change rate detected by the frequency change rate detection means is positive increasing a lagging reactive power of the private generator set when the frequency change rate is negative;

frequency change rate integration means for integrating the frequency change rate detected by the frequency change rate detection means;

frequency variation tendency determination means for determining whether the frequency rises or lowers, based on a frequency change rate integration amount integrated by the frequency change rate integration means;

bias means for applying a bias to the voltage variation reference output from the voltage variation reference determination means to decrease the voltage variation reference when the frequency variation tendency determination means determines that the frequency rises and applying a bias to the voltage variation reference output therefrom to increase the voltage variation reference when the frequency variation tendency determination means determines that the frequency lowers; and protection means for detecting a frequency variation promoted due to a voltage variation of the private generator set caused by adding the voltage variation reference to which the bias is applied by the bias means, to voltage reference of an automatic voltage regulator of the private generator set, thereby opening the circuit breaker and disconnecting the private generator set from a system bus.

2. The system interconnection protective device according to claim 1, further comprising reset means for determining whether the frequency change rate detected by the frequency change rate detection means falls within a narrow range close to zero and resetting the frequency change rate integration integrated by the frequency change rate integration means to zero when the frequency change rate falls within the small range.

3. The system interconnection protective device according to claim 1, wherein the protection means determines whether the private generator set is to be disconnected from the system line on a first condition that the frequency change rate detected by the frequency change rate detection means exceeds a value, on a second condition that the frequency change rate integration amount integrated by the frequency change rate integration means exceeds a value, or by AND of the first and second conditions.

4. The system interconnection protective device according to claim 2, wherein the protection means determines whether the private generator set is to be disconnected from the system line on a first condition that the frequency change rate detected by the frequency change rate detection means exceeds a value, on a second condition that the frequency change rate integration amount integrated by the frequency change rate integration means exceeds a value, or by AND of the first and second conditions.

5. A system interconnection protective device for a private generator set, which interconnects with a system power supply via a circuit breaker, the device comprising:

frequency detection means for detecting a frequency from an output of the private generator set;

frequency change rate detection means for detecting a frequency change rate of the frequency detected by the frequency detection means;

voltage variation reference determination means for defining a relationship between the frequency change rate and voltage variation reference by a function, the voltage variation reference increasing a leading reactive power of the private generator set when the frequency change rate detected by the frequency change rate detection means is positive increasing a lagging reactive power of the private generator set when the frequency change rate is negative, and for allowing a gain or a shape of the function to be switched to a plurality of stages;

voltage variation reference selection means for setting a plurality of threshold values to the frequency change rate detected by the frequency change rate detection means and issuing a select command for selecting the gain of the function or the shape thereof to the voltage variation reference determination means whenever the frequency change rate exceeds each of the threshold values;

frequency change rate integration means for integrating the frequency change rate detected by the frequency change rate detection means;

frequency variation tendency determination means for determining whether the frequency rises or lowers, based on a frequency change rate integration amount integrated by the frequency change rate integration means;

bias means for applying a bias to the voltage variation reference output from the voltage variation reference determination means to decrease the voltage variation reference when the frequency variation tendency determination means determines that the frequency rises and applying a bias to the voltage variation reference output therefrom to increase the voltage variation reference when the frequency variation tendency determination means determines that the frequency lowers;

switch means for determining whether the bias means applies the bias to the voltage variation reference in response to the select command output from the voltage variation reference selection means; and protection means for detecting a frequency variation promoted due to a voltage variation of the private generator set caused by adding the voltage variation reference to which the bias is applied by the bias means, to voltage reference of an automatic voltage regulator of the private generator set, thereby opening the circuit breaker and disconnecting the private generator set from a system bus.

6. The system interconnection protective device according to claim 5, further comprising reset means for determining whether the frequency change rate detected by the frequency change rate detection means falls within a narrow range close to zero and resetting the frequency change rate integration amount integrated by the frequency change rate integration means to zero when the frequency change rate falls within the small range.

7. The system interconnection protective device according to claim 5, wherein the protection means determines whether the private generator set is to be disconnected from the system line on a first condition that the frequency change rate detected by the frequency change rate detection means exceeds a value, on a second condition that the frequency change rate integration amount integrated by the frequency change rate integration means exceeds a value, or by AND of the first and second conditions.

8. The system interconnection protective device according to claim 6, wherein the protection means determines whether the private generator set is to be disconnected from the system line on a first condition that the frequency change rate detected by the frequency change rate detection means exceeds a value, on a second condition that the frequency change rate integration amount integrated by the frequency change rate integration means exceeds a value, or by AND of the first and second conditions.

* * * * *